US011906131B2

(12) United States Patent
Kay

(10) Patent No.: US 11,906,131 B2
(45) Date of Patent: Feb. 20, 2024

(54) FLEXIBLE SUSPENSION LIGHTING

(71) Applicant: PureEdge Lighting LLC, Chicago, IL (US)

(72) Inventor: Gregory L. Kay, Chicago, IL (US)

(73) Assignee: PureEdge Lighting LLC, Chicago, IL (US)

( * ) Notice: Subject to any disclaimer, the term of this patent is extended or adjusted under 35 U.S.C. 154(b) by 0 days.

(21) Appl. No.: 17/659,768

(22) Filed: Apr. 19, 2022

(65) Prior Publication Data

US 2022/0341553 A1 Oct. 27, 2022

Related U.S. Application Data

(60) Provisional application No. 63/178,805, filed on Apr. 23, 2021.

(51) Int. Cl.

| | |
|---|---|
| ***F21S 8/06*** | (2006.01) |
| ***F21V 5/04*** | (2006.01) |
| ***F21V 21/008*** | (2006.01) |
| ***F21S 8/02*** | (2006.01) |
| ***F21Y 115/10*** | (2016.01) |
| *F21W 131/10* | (2006.01) |

(52) U.S. Cl.

CPC ............... *F21S 8/061* (2013.01); *F21S 8/026* (2013.01); *F21V 5/04* (2013.01); *F21V 21/008* (2013.01); *F21W 2131/10* (2013.01); *F21Y 2115/10* (2016.08)

(58) Field of Classification Search

CPC ... F21S 8/061; F21S 8/026; F21S 4/26; F21V 5/04; F21V 21/008; F21V 23/06; F21W 2131/10; F21Y 2115/10

See application file for complete search history.

(56) References Cited

U.S. PATENT DOCUMENTS

| | | | | |
|---|---|---|---|---|
| 6,186,645 B1 * | 2/2001 | Camarota | F21S 8/032 | 362/240 |
| 6,536,925 B1 * | 3/2003 | McGuire | F21L 14/02 | 362/147 |
| 8,376,576 B2 * | 2/2013 | Sloan | F21V 23/002 | 362/555 |
| 8,511,849 B2 * | 8/2013 | Sloan | H05B 45/00 | 362/225 |
| 9,228,732 B2 * | 1/2016 | Li | F21V 31/00 | |
| 9,841,149 B2 * | 12/2017 | Wu | F21V 21/112 | |
| 10,119,665 B2 * | 11/2018 | Lin | F21S 4/22 | |
| 10,352,510 B2 * | 7/2019 | Van Winkle | F21V 23/001 | |
| 10,845,013 B2 * | 11/2020 | Tolen | F21V 23/006 | |
| 2005/0128751 A1 * | 6/2005 | Roberge | H05B 45/325 | 362/276 |
| 2007/0171640 A1 * | 7/2007 | Sloan | G09F 9/33 | 362/240 |
| 2011/0122608 A1 * | 5/2011 | Napier | F21V 21/112 | 362/184 |

(Continued)

*Primary Examiner* — Tsion Tumebo

(74) *Attorney, Agent, or Firm* — Bishop, Diehl & Lee, Ltd.

(57) ABSTRACT

A tension-mounted support lighting system provides visually stimulating flexile, lighting housed within an unconventional silicone lens. The system offers flexible installation and conceptual yet functional design. The lighting strip bends up and down giving it the unique ability to traverse open spaces wall to wall, wall to ceiling, or floor to ceiling. Various optional components allow customization and control for an ideal outdoor lighting system.

16 Claims, 5 Drawing Sheets

(56) References Cited

U.S. PATENT DOCUMENTS

| | | | | |
|---|---|---|---|---|
| 2015/0300585 | A1* | 10/2015 | Wu | F21K 9/20 362/222 |
| 2016/0327252 | A1* | 11/2016 | Ray | F21V 21/008 |
| 2016/0356454 | A1* | 12/2016 | Camarota | F21V 21/005 |
| 2018/0347789 | A1* | 12/2018 | Moore | F21V 21/005 |
| 2019/0230868 | A1* | 8/2019 | Tao | A01G 7/045 |
| 2020/0109828 | A1* | 4/2020 | Tolen | F21V 29/83 |
| 2020/0393095 | A1* | 12/2020 | Walsh | F21S 4/26 |

* cited by examiner

FLEXIBLE SUSPENSION LIGHTING

RELATED APPLICATION

This application claims the filing priority of U.S. Provisional Application No. 63/178,805 titled "Flexible Suspension Lighting" and filed on Apr. 23, 2021. The '805 Provisional Application is hereby incorporated in its entirety by reference.

TECHNICAL FIELD OF THE INVENTION

The present disclosure relates to lighting systems. More specifically, the disclosure relates to suspension lighting systems, particularly for outdoor use.

BACKGROUND OF THE INVENTION

Functional and decorative outdoor lighting has been predominately comprised of hanging lights, string lights and ground lighting—i.e., lights which project light upward from the ground. Unfortunately, none of these existing lighting systems provides consistent illumination combined with an aesthetically pleasing concept. Hanging lights are largely decorative having limited useful illumination. String lights can be spread out, but abundant wiring has a negative aesthetic and illumination is often spotty. Finally, ground lighting has little effect above a few feet and can be easily blocked.

Until the invention of the present application, these and other problems in the prior art went either unnoticed or unsolved by those skilled in the art. The present invention provides suspended lighting that is both consistently illuminating and aesthetically enhancing to most any area. The disclosed lighting system performs multiple functions without sacrificing portability features, design, style or affordability.

SUMMARY OF THE INVENTION

There is disclosed herein an improved outdoor lighting system and method which avoids the disadvantages of prior lighting systems and methods while affording additional structural and operating advantages.

The system provides a visually stimulating flexile, tension hung lighting system housed within an unconventional silicone lens, offering flexible installation and conceptual yet functional design. The lighting strip bends up and down giving it the unique ability to traverse open spaces wall to wall, wall to ceiling, or floor to ceiling.

Generally speaking, the lighting system comprises a flexible body section, a flexible lens, a plurality of LEDs, a support cable, and a power system. The flexible body section comprises two opposing ends defining a length and a first longitudinal cavity extending through the body section for the entire length, while the flexible lens has a second longitudinal cavity and is attachable to the flexible body section. The plurality of LEDs is positioned within the second longitudinal cavity, with the body section, lens and LEDs forming a lighting structure. The support cable is threaded into and through the first longitudinal cavity and each end is fixed to a surface to thereby suspend the lighting structure. Finally, a power cable electrically connects to the plurality of LEDs and a power source.

In specific embodiments, the flexible lens is comprised of silicone and may be either translucent or transparent.

In other specific embodiments, an end cap secured to each opposing end of the flexible body. Further, the flexible lens preferably has a length equal to the length of the flexible body section.

In another specific embodiment of the lighting system, a first anchor is fixed to a first surface and a second anchor is fixed to a second surface, wherein the opposing ends of the support cable are attached to the first and second anchors to suspend the lighting system, wherein at least one of the first and second anchors comprises a turnbuckle.

In a specific embodiment, a 0.75" wide round lens, offers superior color quality and performance while creating uniform illumination without pixilation. Various color temperatures ranging from 2000K to 5700K may be provided, including two options of 2700K (27D) or 3000K (30D) and a tunable white (2K4K or 27K6)—using the latest in LED Technology tunable white grants independent control for adjusting color temperature and brightness.

In a specific embodiment, the system is useable with two dimmers or a controller (CDMX-1) for fast and accurate adjustment with options for pre-set scenes.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
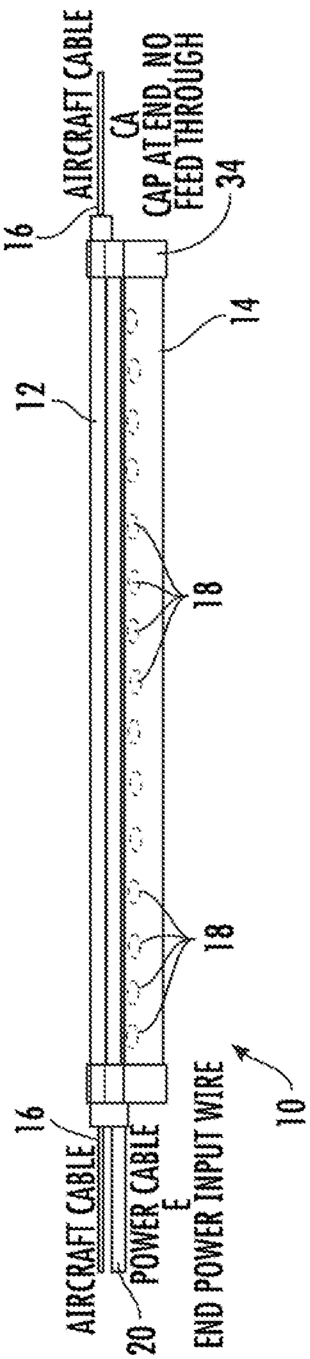
FIG. 1 is a side view of an embodiment of the lighting system with a single power feed.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-9, there is illustrated a suspension lighting system 10, generally for use in outdoor or simulated outdoor settings. The particular illustrated suspension lighting system 10 is for a tensioning between two structures. However, while the embodiments illustrated are shown to be tensioned in a substantially horizontal orientation, it should be understood that the principles of the invention can be more broadly applied to horizontal, angled and even vertical suspension.

Figure 2:
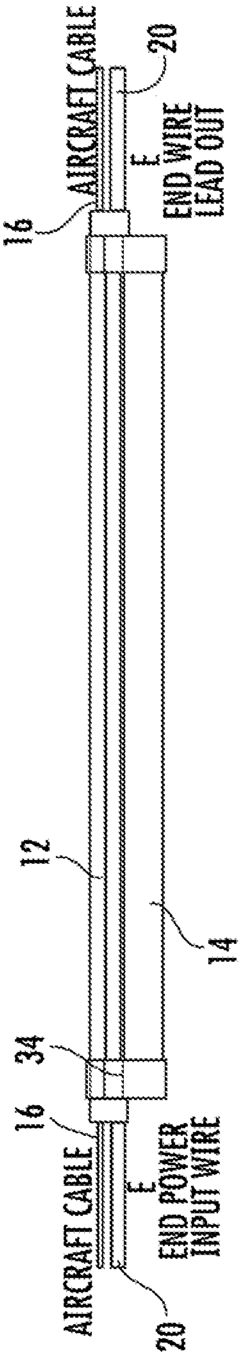
FIG. 2 is a side view of an embodiment of the disclosed lighting system with power feeds from both ends.

Generally speaking, with reference to FIGS. 1 and 2, the system 10 is comprised of a body section 12, a lens 14, and a support cable 16. A plurality of LED lights 18 are secured within the lens 14 which attaches to the body section 12. The support cable 16 passes through the body section 12 and extends between two structures (not shown), where it is secured in any known manner. Further, a first end of at least one power cable 20 enters the body section 12 to connect to the LED lights 18. A second end of the power cable 20 is connected to a power source 22. Power may be provided from one or both ends of the lighting system 10. Further details on these components and features of the lighting system 10 are provided below.

Figure 3:
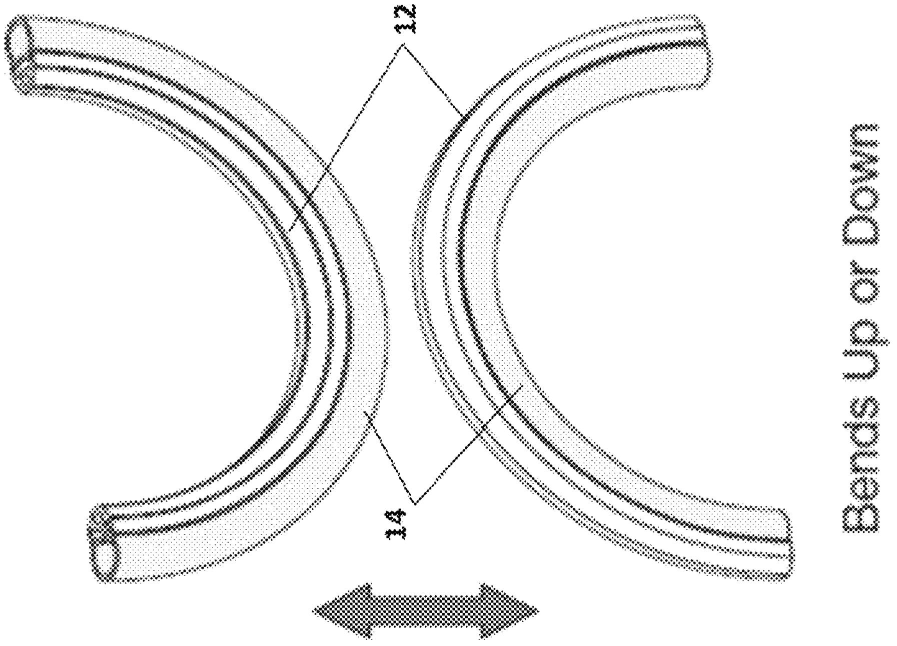
FIG. 3 is a perspective view of an embodiment of the flexible body section and lens being bent upward and downward.
Figure 4B:
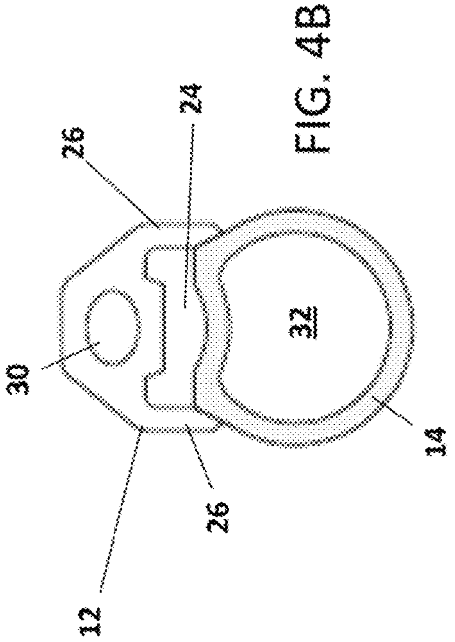
FIG. 4B is an enlarged image of FIG. 4A.
Figure 4A:
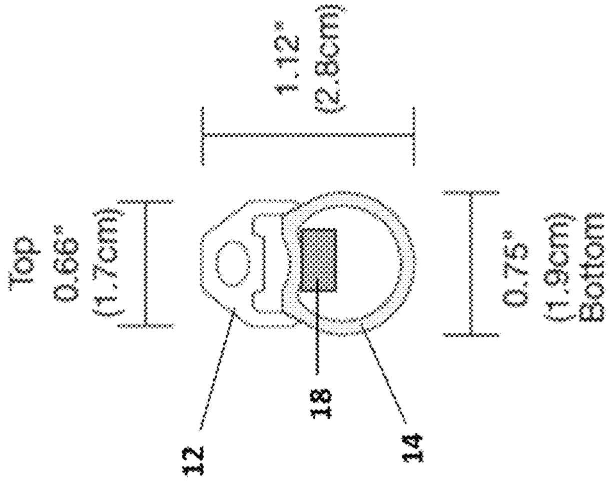
FIG. 4A is a cross-section of an embodiment of the lighting structure showing preferred dimensions.
Figure 5B:
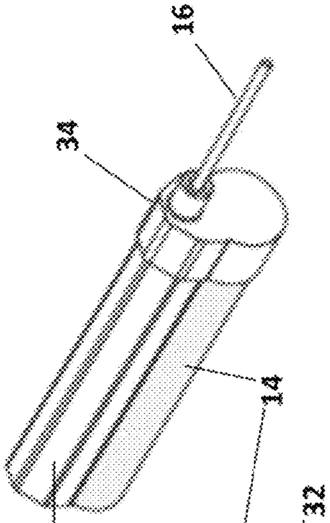
FIG. 5B is a cut-away perspective view of a second, closed end of the disclosed lighting system.
Figure 5A:
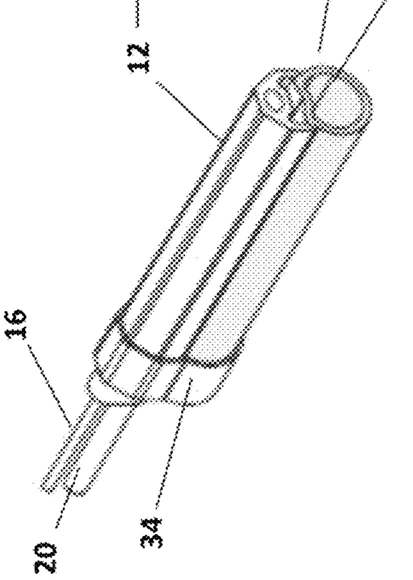
FIG. 5A is a cut-away perspective view of a first, open end of the disclosed lighting system.
Figure 6:
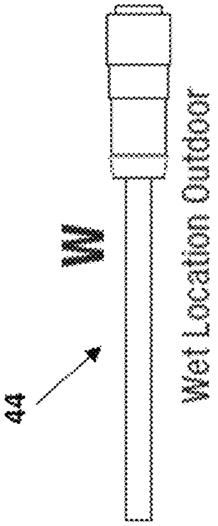
FIG. 6 is a side view of an embodiment of a power cable connector.
Figure 7:
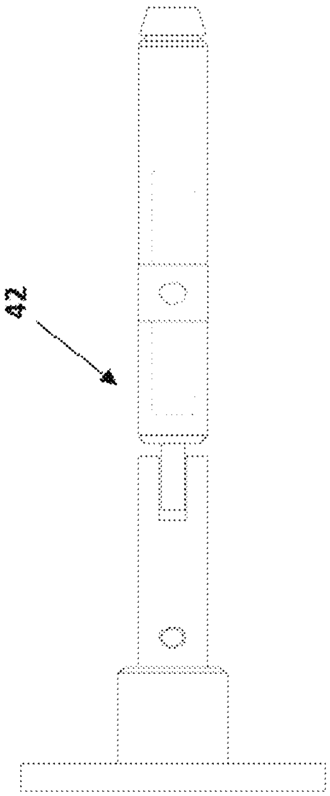
FIG. 7 is a side view of an embodiment of a turnbuckle and anchor.
Figure 8:
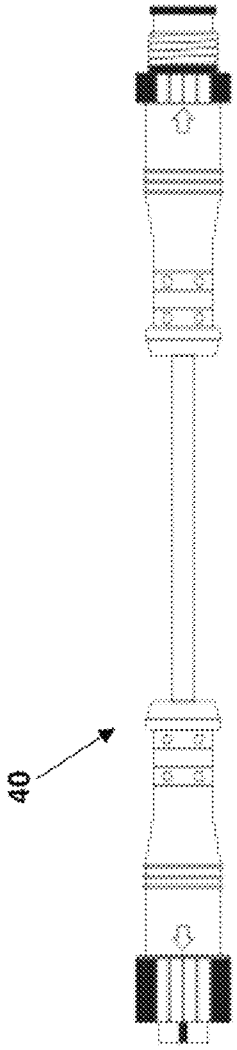
FIG. 8 is a side view of an embodiment of an electrical connector.

The body section 12 of the system 10 is preferably comprised of a flexible extrudable material to allow sufficient bending in at least two directions (e.g., up and down), as illustrated in FIG. 3. Preferably, a UV-resistant polyvinyl chloride (PVC) material is used. In a preferred embodiment, the body section 12 includes an open longitudinal channel 24 defined by two lateral sidewalls 26 and a base surface 28, which may be reflective for improved light emission through the attached lens 14. A longitudinal cavity 30 runs parallel to the channel 24 and is used for housing a substantial portion of both the support cable 16 and power cable 20 as they are threaded through the body section 12.

The lens 14 is preferably comprised of a flexible transparent or translucent material, such as silicone, extruded to form a tube-like structure. A cavity 32 runs through the lens 14 to house LEDs 18. In a preferred embodiment, the lens 14 is approximately 0.75 inches wide to offer superior color quality and performance while creating uniform illumination without pixilation. The lens 14 preferably removably attaches to the body section 12 via a friction fit or snap fit with the lateral sidewalls 26. Other attachment means are contemplated as well, as would be known by those of skill in the art. An end cap 34 is attached at each end of the body section 12 and lens 14 assembly to enclose the lights. A sealable opening within the end cap 34 allows the support cable 16 and any electrical cable to pass into the lighting device without also letting in moisture from the environment.

The body section 12 can be produced in numerous lengths—e.g., 12-inch sections to 40 foot sections—for customized displays. Likewise, the lens 14 can also be customized to a specific length. Preferably, the length of the lens 14 is substantially identical to the length of the body section 12. Together, the body section 12, lens 14 and LEDs 18 form a lighting structure which is suspended by the support cable. However, in other embodiments, the lens 14 may be made in multiple smaller sections, which then attach to a single body section 12 in a continuous light or in discontinuous increments of light, as desired. In fact, multiple lighting structures may be suspended by a single support cable 16 and connected together by a cable connector 40 similar to that shown in FIG. 8. For example, a 20-foot lighting structure could be suspended over an area or two nine-foot lighting structures—including a 12-inch gap—could be suspended on a single support cable over the same area. All possible alternative configurations are too numerous to mention, but would be well-understood by those skilled in the art.

The support cable 16 can be any high-tensile strength cable or metal rope, most preferably aircraft cable. The cable 16 may be made taut using a turnbuckle 42 (see FIG. 7) on at least one end and preferably both ends to secure to a structure (e.g., ceiling or wall stud, column, post, etc.).

Power to the light assembly is preferably provided by 14-gauge electrical cable 20, suitable for indoor and outdoor use. Flexible, watertight cable connectors 44 (FIG. 6) can be used to couple the assembly safely and reliably to a power source 22, such as, for example, a 120/277 VAC-24 VDC with universal dimming ELV, Triac or 1-10V dimmers.

Figure 9:
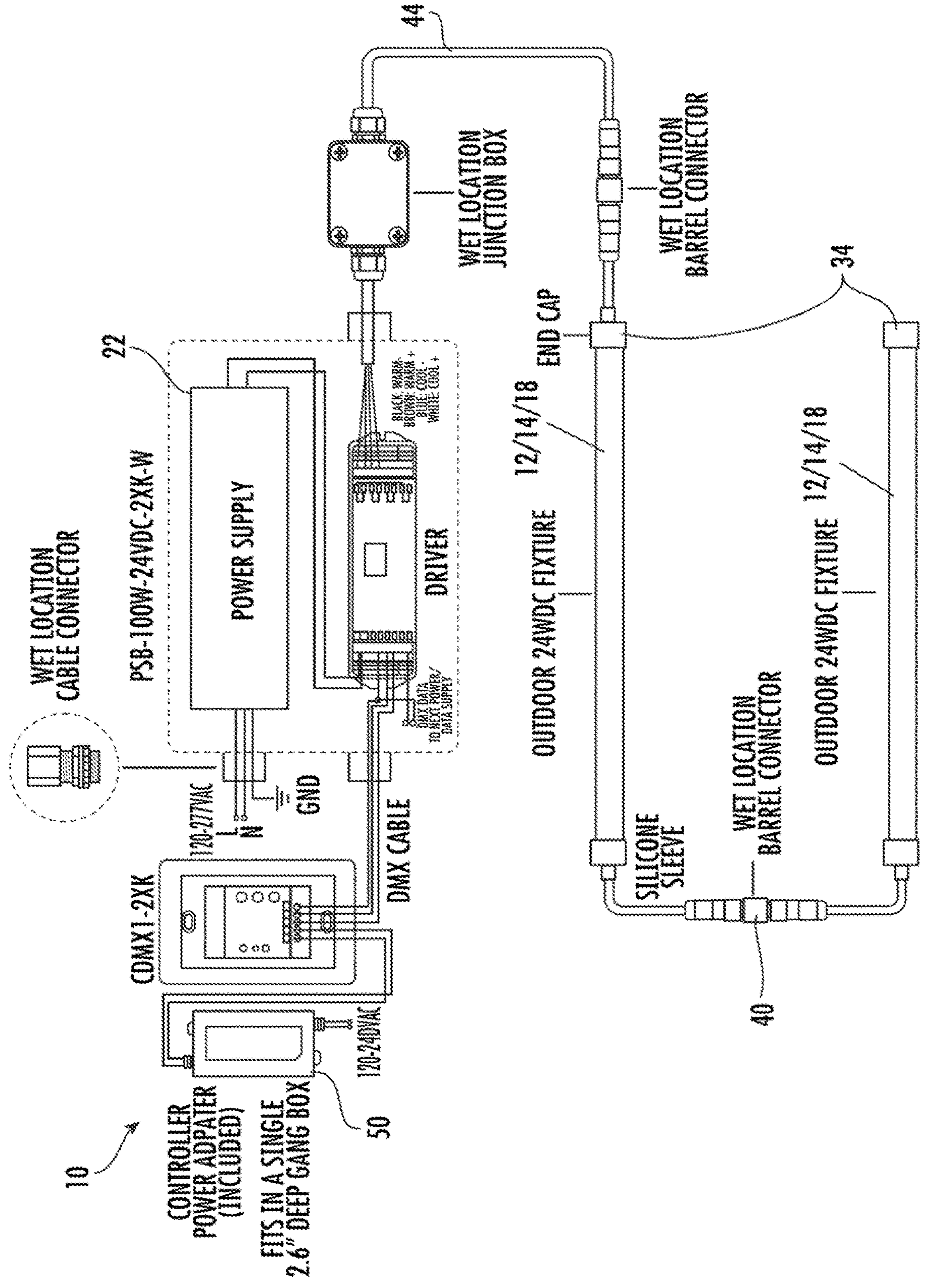
FIG. 9 is a schematic of an embodiment of a preferred embodiment of the disclosed lighting system including power source and controller.

In a most preferred assembly of the disclosed lighting system, a tunable controller 50 is connected to the power source 22, as illustrated in FIG. 9, to allow adjustment (manually or automatically) of the lighting. Overall, the flexible, tension hung lighting fixture provides a visually stimulating layout with simple dynamic installation and a conceptual yet functional design. The lighting can be provided in various color temperatures ranging from 2000K to 5700K, including warm dim options of 2700K (27D) or 3000K (30D) and tunable white (2K4K or 27K6). Using the latest in LED technology, tunable white grants independent control for adjusting color temperature and brightness. Use with two dimmers or a tunable white controller (e.g., CDMX-1 by PureEdge Lighting of Chicago, IL) for fast and accurate adjustment and pre-set scenes.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A lighting system comprising:

a flexible body section having two opposing ends defining a length and a first enclosed longitudinal cavity extending through the body section for the entire length;

a flexible lens having a second enclosed longitudinal cavity and attachable to the flexible body section;

a plurality of LEDs positioned within the second enclosed longitudinal cavity, the body section, lens and LEDs forming a lighting structure;

a support cable having two opposing ends, the support cable being threaded into and through the first enclosed longitudinal cavity and each end being fixed to an exterior surface to thereby suspend the lighting structure for operation; and a power cable electrically connected to the plurality of LEDs and a power source.

2. The lighting system of claim 1, wherein the flexible lens is comprised of silicone.

3. The lighting system of claim 2, wherein the flexible lens is translucent.

4. The lighting system of claim 2, wherein the flexible lens is transparent.

5. The lighting system of claim 1, further comprising an end cap secured to each opposing end of the flexible body.

6. The lighting system of claim 1, wherein the flexible lens has a length equal to the length of the flexible body section.

7. The lighting system of claim 5, wherein the end caps secure to ends of the flexible lens.

8. The lighting system of claim 1, further comprising a first anchor fixed to a first surface and a second anchor fixed to a second surface, wherein the opposing ends of the support cable are attached to the first and second anchors to suspend the lighting system.

9. The lighting system of claim 8, wherein at least one of the first and second anchors comprises a turnbuckle.

10. The lighting system of claim 1, wherein two lighting structures are connected together by a connector and suspended by the support cable.

11. A lighting system comprising:

a flexible body section comprising:

two opposing ends defining a length;

a first enclosed longitudinal cavity extending through the body section for the entire length; and a longitudinal channel defined by two sidewalls and a base wall;

a flexible lens having a second enclosed longitudinal cavity and attachable to the flexible body section adjacent the longitudinal channel;

a plurality of LEDs positioned within the second enclosed longitudinal cavity, wherein the flexible body section, the flexible lens and the plurality of LEDs form a lighting structure;

a support cable having two opposing ends, the support cable being threaded into and through the first enclosed longitudinal cavity and exiting each end of the first enclosed longitudinal cavity for affixing each opposing end to exterior support surfaces and thereby suspend the lighting structure for operation;

a power cable electrically connected to the plurality of LEDs and a power source; and an end cap secured to each opposing end of the flexible body, the end caps having an opening to allow passage of the support cable and power cable.

12. The lighting system of claim 11, wherein the flexible lens has a length equal to the length of the flexible body section.

13. The lighting system of claim 12, wherein the end caps secure to ends of the flexible lens.

14. The lighting system of claim 12, further comprising a first anchor fixed to a first surface and a second anchor fixed to a second surface, wherein the opposing ends of the support cable are attached to the first and second anchors to suspend the lighting system.

15. The lighting system of claim 14, wherein at least one of the first and second anchors comprises a turnbuckle.

16. The lighting system of claim 11, wherein two lighting structures are connected together by a connector and suspended by the support cable.

* * * * *